(No Model.)
C. F. HORNBECK.
WHEEL HARROW.
No. 272,254. Patented Feb. 13, 1883.
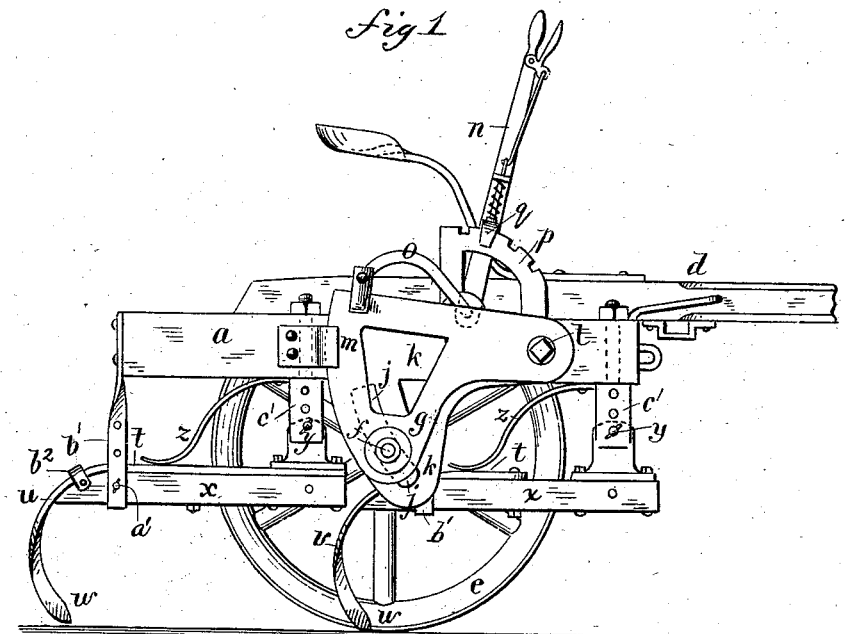
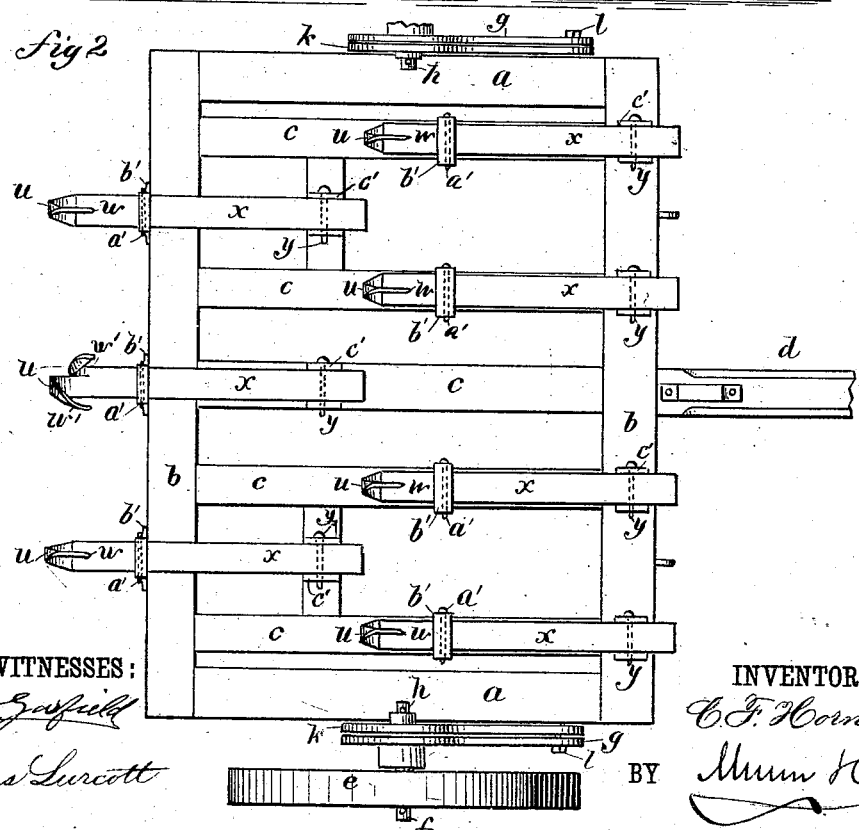
WITNESSES:
INVENTOR:
BY
ATTORNEYS.

UNITED STATES PATENT OFFICE.

CORNELIUS F. HORNBECK, OF OWEGO, NEW YORK.

WHEEL-HARROW.

SPECIFICATION forming part of Letters Patent No. 272,254, dated February 13, 1883.

Application filed June 15, 1882. (No model.)

*To all whom it may concern:*

Be it known that I, CORNELIUS F. HORNBECK, of Owego, in the county of Tioga and State of New York, have invented a new and Improved Wheel-Harrow, of which the following is a full, clear, and exact description.

My invention consists of improvements designed to increase the efficiency of wheel-harrows and simplify and cheapen the construction, as herein described.

Reference is to be had to the accompanying drawings, forming part of this specification, in which similar letters of reference indicate corresponding parts in both the figures.

Figure 1 is a side elevation of my improved wheel-harrow with one of the wheels removed, and Fig. 2 is a plan view of the machine inverted.

The frame is a rectangular structure of side bars, $a$, cross-bars $b$, and intermediate bars, $c$, of wood or other approved material, which may be arranged as shown in the drawings or in any approved way, and a tongue, $d$, is attached to the top of said frame at the middle, suitably for hitching on the team. The wheels $e$ are attached to short axles $f$, which are attached to the vertically-swinging arms $g$, and have stud projections $h$ extending through guide-slots $j$ in the stay-brackets $k$. The latter are rigidly attached to the side bars, $a$, of the frame. The frame and the attachments thereof may by suitable means be swung up and down along the wheels on the pivots $l$, by which arms $g$ are attached to the frame. The arms $g$ swing in the guide-clips $m$, attached to the sides of the frame for properly confining them at the ends opposite to the pivots $l$. The said arms are connected to their respective adjusting-levers $n$ by cranked rods $o$. The levers $n$ are provided with spring-pawls $q$, which work in racks $p$ on the frame, for the purpose of holding said frame in position.

I propose to construct the teeth of flat bar iron or steel by bending short bars thereof a short distance from one end, which is to remain flat and straight in the part $t$, into the curved hook shape $u$ and twisted point $w$, the point and a portion of the curved part $u$ behind it being turned edgewise to the direction in which the teeth work, thus making simple and cheap teeth, which are also well calculated for efficiency. The shape also enables the teeth to be attached in a simple and substantial way by securing the flat part $t$ to a stock, $x$, of wood or other material, ranging forward and backward of the machine, to be attached by a pivot, $y$, at the front end, so that the teeth may rise and fall. Each of the teeth has a spring, $z$, to regulate its action in the ground. I also propose to secure the stock rigidly by a pin, $a'$, in a yoke, $b'$, if desired, the yokes being also employed for a guide and stay to the teeth. Said yokes consist of a bent metal strap or bar attached to the frame and extending downward therefrom, suitably for the tooth-stocks $x$ to work in them.

The pivot $y$ of the tooth-stock is to be adjustable up and down in the hanger $c'$ to regulate the pitch of the tooth. Two or more sets of the teeth will be employed in front and rear ranks, and in alternate order transversely, as shown in Fig. 2. I also propose to make the yokes $b'$ adjustable vertically on the frame, so that they can be shifted, as well as joints $y$, for regulating the height of the teeth.

In practice I shall at times attach two teeth to each stock $x$, one setting a little in advance of the other as to their points, as at $w'$, Fig. 2, and will extend the parts $t$ the whole length of the stocks and beneath the pivot-blocks at $y$, and fasten the teeth and the pivot-blocks by the same bolts at or near the forward end of the stock, as is shown with the rear stock, $x$, in Fig. 1, the object being to make said parts $t$ long to increase the elasticity; and I will also provide yokes $b^2$, fixed to the stocks and reaching over the teeth, allowing the teeth sufficient play, while preventing their breaking away from their fastenings or the stocks. The double teeth $w'$ may be formed on one shank $t$ by splitting its end; or the said teeth may have separate shanks and be separately attached side by side on the top of the stock.

I am aware that it is not new to secure harrow-teeth to beams or stocks which are hinged in front, and to arrange springs to bear upon said beams; but

What I claim as new and of my invention is—

In wheel-harrows, the front hinged stock, $x$, the yoke $b'$, and the spring $z$, in combination with the tooth $u$, having a flat shank arranged on top of the stock and passing through a keeper, $b^2$, on the rear end of said stock, as shown and described.

CORNELIUS F. HORNBECK.

Witnesses:
 W. A. SMYTH,
 JAMES E. MANNING.